United States Patent Office 3,634,360
Patented Jan. 11, 1972

3,634,360
POLYURETHANE ELASTIC FILAMENTS AND FIBERS
Horst Wieden and Wolfgang Rellensmann, Dormagen, and Dieter Dieterich and Gunther Nischk, Leverkusen, Germany, assignors to Farbenfabriken Bayer Aktiengesellschaft, Leverkusen, Germany
No Drawing. Continuation of application Ser. No. 556,862, June 13, 1966. This application June 19, 1970, Ser. No. 48,930
Claims priority, application Germany, June 15, 1965, F 46,338
Int. Cl. C08g 22/04, 53/00
U.S. Cl. 260—77.5 SP                                    1 Claim

ABSTRACT OF THE DISCLOSURE

Polyurethane fibers and filaments are prepared by preparing a solution of a polyurethane polymer containing tertiary nitrogen atoms; mixing into the solution a bis- or polyfunctional alkylating agent in a quantity up to that equivalent to the tertiary nitrogens present in the polymer; spinning the solution into a filament and exposing the spun filament to a temperature from 50–150° C. to cause cross-linking by quaternization of tertiary nitrogen atoms.

---

This is a continuation of our prior copending application, Ser. No. 556,862, filed June 13,1966 now abandoned.

This invention relates to a process for the production of crosslinked rubbery elastic filaments and fibers based on polyurethane and more particularly to a process wherein crosslinking takes place after the forming process by bis- or polyalkylation through tertiary nitrogen atoms of different polyurethane chains.

The production of rubbery elastic filaments and fibers by the diisocyanate polyaddition process has been known for some time. The process consists in first reacting predominantly linear hydroxyl compounds, e.g. linear or only slightly branched hydroxyl group-containing polyesters, polyesteramides, polyethers, polythioethers or polyacetals, in the melt with an excess of aliphatic or aromatic diisocyanates. The resulting prepolymers which have free isocyanate groups are then reacted in polyacrylonitrile solvents such as dimethylformamide, dimethylacetamide or dimethylsulphoxide, with low molecular weight chain lengthening agents which are bifunctional towards isocyanate, such as water, aliphatic and aromatic diamines, hydrazine, dicarboxylic acid hydrazides and glycols.

Very highly viscous polyurethane solutions are obtained after a certain reaction period, which solutions can be formed into rubbery elastic filaments and fibers by the dry or wet spinning process. However, filaments and fibers produced by this method are soluble in many organic solvents or tend to swell to a great extent in such solvents. In addition, they can only be dyed to a moderate extent with acid dyestuffs if no basic homopolymers were incorporated as dyeing additives during spinning. In addition, elastic recovery after stretching of the filaments and the response to tension under load leave room for improvements.

It is therefore an object of this invention to provide improved polyurethane fibers. It is another object of this invention to provide polyurethane fibers having improved affinity for dyes. It is a further object of this invention to provide polyurethane fibers having improved physical properties. It is still another object of this invention to provide an improved process for making polyurethane fibers.

The foregoing objects and others which will become apparent from the following description are accomplished in accordance with the invention generally speaking by providing spinning solutions of substantially linear polyurethane polymers having tertiary nitrogen atoms built into the molecule in a highly polar solvent, the tertiary nitrogen being present in an amount of at least 100 milliequivalents tertiary nitrogen per kilogram of solid substance, and the polymer solutions are then treated with bis- or polyfunctional alkylating agents before the spinning process. The filaments or fibers obtainable by the wet- or dry spinning process are then crosslinked after several days storage at room temperature. The rate of crosslinking can be increased in known manner, by increase in temperature.

The new process is thus characterized in that the solutions of predominantly linear, high molecular weight polyurethane containing tertiary nitrogen atoms, which are prepared by known methods in polyacrylonitrile solvents, are treated before the spinning process with bis- or polyfunctional alkylating agents and spun into filaments and fibers, the crosslinking of the filaments and fibers taking place through the subsequent quaternating reaction.

To carry out the process, polyhydroxyl compounds having an OH number of 35 to 120, preferably 40 to 70, are reacted in known manner in the melt or in inert solvents such as methylene chloride, tetrahydrofuran, dioxane, benzene and chlorobenzene, if desired in admixture with low molecular weight diols such as butanediol, and with excess aliphatic or aromatic diisocyanates, below 150° C. The excess of diisocyanates may be up to 300% calculated on the hydroxyl groups present, so that the melt may contain free diisocyanate in addition to the isocyanate-modified polyhydroxyl compounds.

Any suitable polyhydroxyl compounds may be used such as, for example, polyesters, polyester amides, polyethers, polythioethers and polyacetals which contain terminal hydroxyl groups and have a substantially linear structure. The melting point of these compounds should preferably be below 60° C. because otherwise the elastic properties of the end products are impaired, especially at the low temperatures.

The linear, hydroxyl-group-containing polyesters used as starting materials can be prepared in known manner by condensation of dicarboxylic acids with diols at elevated temperatures. The acid numbers are generally below 10, preferably between 0 and 3. Any suitable dicarboxylic acids for these polyesters may be used, such as, for example, succinic acid, adipic acid, pimelic acid, azelaic acid, sebacic acid, thiodibutyric acid and sulphonyl dibutyric acid. Any suitable glycol may be used, such as, for example, ethylene glycol, diethylene glycol, 1,2-propanediol, 1,4-butanediol, 1,3-butanediol, 1,6-hexanediol, hexahydro-p-xylylene glycol, 2,2-dimethyl-1,3-propanediol and their alkylation products. Polyesters from lactones, e.g. ε-caprolactone are also advantageous starting materials.

Any suitable polyester amides may be used such as those obtained by the incorporation of amino alcohols such as ethanolamine or propanolamine, or diamines such as hexamethylene diamine or piperazine in polyesters.

Any suitable polyethers include polyethylene glycol ethers, polypropylene glycol ethers or polytetramethylene glycol ethers, the addition product of alkylene oxide, such as, ethylene oxide, propylene oxide, butylene oxide and the like to active hydrogen containing initiators such as the glycols and amines mentioned above.

Any suitable polythioethers may be used such as those obtained from thiodiglycols and polyacetals are obtained by reacting glycols with formaldehyde or from cyclic acetals.

Any suitable diisocyanate may be used such as, for example, for the above-mentioned
p-phenylene diisocyanate,
1,5-naphthylene-diisocyanate,
4,4'-diphenylmethane diisocyanate,
3,3'-dimethyl-4,4'-diphenylmethane diisocyanate,
4,4'-diisocyanate stilbene,
4,4'-dibenzyl diisocyanate,
mixtures based on 2,4- and 2,6-toluylene diisocyanate and hexamethylene diisocyanate. Especially suitable are diphenylmethane-4,4'-diisocyanate, the isomeric toluylene diisocyanate and hexamethylene diisocyanate.

The isocyanate-modified polyhydroxyl compounds which contain free isocyanate groups thus prepared are then dissolved in solvents and reacted at —10° to 100° C., preferably 10–60° C., with low molecular weight chain lengthening agents having a molecular weight below 500, preferably about 300, such as water, glycols, amino-alcohols, diamines, dihydrazides or hydrazine. Depending on the choice of chain lengthening agent, quantities of 80–130%, based on the free isocyanate groups still present in the reaction product, are used. At the same time or separately, there is used, in addition to the usual chain lengthening agent, up to 50 mols percent of a co-chain lengthening agent which contains at least one tertiary nitrogen atom in addition to two hydrogen atoms that are reactive to isocyanate groups. It must be noted, however, that the resulting elastomer substance must contain at least 100 milli-equivalents of tertiary nitrogen per kilogram of solid substance.

According to another method of carrying out the process, the components containing at least one tertiary nitrogen atom, which are used as co-chain lengthening agents, may be added directly to the reaction melt of polyhydroxyl compound and diisocyanate and the subsequent reaction may be then carried out with the usual chain lengthening agents in the solvent.

The solvents used are organic, so-called polyacrylonitrile solvents such as dimethylformamide, dimethylacetamide, dimethylsulphoxide, or dimethoxydimethylacetamide. They must be free from constituents which are capable of reacting with diisocyanates. These highly polar solvents may contain other inert solvents, e.g., dioxane, tetrahydrofuran or chlorobenzene, in minor quantities (up to about 20% by weight).

In addition to water, suitable chain lengthening agents include glycols such as p-phenylene-bis-beta-hydroxyethylether, 1,5 - naphthylene-bis-beta-hydroxyethylether, ethylene glycol, 1,4-butanediol, amino alcohols such as ethanolamine, diamines such as piperazine, ethylene diamine, N-methyl-propylene-diamine acid hydrazides such as carbodihydrazide, adipic acid dihydrazide, sebacic acid dihydrazide or hydrazine (hydrate).

The components used as co-chain lengthening agents, which contain at least one tertiary nitrogen atom in addition to the two hydrogen atoms reactive with isocyanate groups, are low molecular weight, monomeric compounds such as, for example, N-methyl diethanolamine,
bis-(beta-hydroxypropyl)-methylamine,
N-propyl-diethanolamine,
N-cyclohexyl-diethanolamine,
N-(gamma-aminopropyl)-N,N'-dimethyl-ethylene diamine,
N-(gamma-aminopropyl)-N-methylethanolamine,
N,N'-bis-(beta-hydroxyethyl)-N,N'-diethylhexahydro-p-phenylene diamine,
N,N-bis-(gamma-aminopropyl)-N,N-dimethylethylene diamine,
N,N'-bis-(beta-hydroxyethyl)-piperazine,
N,N'-bis-(gamma-aminopropyl)-piperazine,
N-(beta-hydroxyethyl)-piperazine,
N-(beta-aminoethyl)-piperazine and the like.

Depending on the chain lengthening agents chosen and on the reaction conditions, the reaction solutions are obtained after a greater or lesser length of time which have a viscosity suitable for spinning.

The soluble bis- or polyfunctional alkylating agents are then stirred into the highly viscous spinning solution at room temperature or slightly elevated temperature. The alkylating agents are preferably used in such quantities that all the tertiary nitrogen of the end product is quaternated.

It is, of course, also possible to use less or more than the equivalent quantity of bis- or polyfunctional alkylating agent according to what degree of crosslinking it is desired to obtain subsequently, provided the reaction is not controlled by the content of tertiary nitrogen. However, as a rule it is not advisable to use more than the equivalent quantity of alkylating agent because if excess is used, the alkylating agent will partly react only monofunctionally and consequently, the degree of crosslinking of the end product will be reduced.

The bis- or polyfunctional alkylating agents which are used comprise organic halogen compounds which are not removed from the elastomer substance when it is spun, as is the case with the solvent. Any suitable bis- or polyfunctional alkylating agent may be used, such as, for example, 4,4'-bis-chloromethyl-diphenylether,
p-xylylene-dichloride,
1,3-dimethyl-4,6-di-(chloromethyl)-benzene,
1,3,5-tris-chloromethyl-2,4,6-trimethylbenzene,
3,4-bis-chloromethyl-toluene,
2,4-bis-chloromethyl-toluene,
1,4-dibromo-2,3-dihydroxy-butane,
4,4'-bis-chloromethyl-diphenyl,
9,10-bis-chloromethyl-anthracene,
1,3-bis-bromomethylbenzene,
3,3-bis-bromomethyl-oxa-cyclobutane,
2,2'-p-phenylene dihydroxy-diethylbromide,
4,4'-bis-chloromethyl-diphenylmethane,
1,4-dibromobutene (2),
1,2,3,5-tetrakis-chloromethyl-benzene,
1,2,3,4-tetrakis-chloromethylbenzene,
2,6,2',6'-tetrakis-bromomethyl-diphenyl,
1,5-dibromo-3,3-dicyanopentane,
bis-chloroacetyl-hydrazine,
bis-chloroacetyl-piperazine,
bis-chloroacetyl-o-phenylene-diamine-4-carboxylic acid,
2,4,6-tris-chloromethyl-toluene,
3,4,5-tris-chloromethyl-toluene,
2,3,4,5-tetrakis-chloromethyl-toluene,
2,3,4,5,6-pentakis-chloromethyl-toluene,
di-[p-(chloroacetyl)-phenyl]-ether,
1,4-bis-bromomethyl-diphenylether,
dibromobutane and halogenoacylated diamines,
such as methylene-bis-chloracetamide, N,N'-bis-chloroaceto hexamethylene diamine and the like.

The highly viscous elastomer solutions containing bis- or polyfunctional alkylating agents are surprisingly, stable for several days at room temperature, or moderately elevated temperature, and the viscosity increases only very slowly. However, the solutions are usually spun in the course of 48 hours by the known methods of dry or wet spinning after the addition of alkylating agents and if desired, also pigmentation with titanium dioxide.

The filaments and fibers produced in this way have been converted into the cross-linked state after several days storage at room temperature but more rapidly after a heat treatment at a temperature of 50°–150° C., preferably 80–110° C., by the quaternating reaction taking place between the bis- or polyfunctional alkylating agents and tertiary nitrogen atoms of the macro-molecular polyurethane chains, so that they will no longer dissolve in organic solvents. Insolubility and reduction in the tendency to swell in organic solvents are of particular importance for chemical dry cleaning. Parallel with this, an improvement is achieved in the elastic properties of the filaments, as manifested in a lower permanent elongation and a reduction in the plastic flow under a given load. At the same time, the modulus increases and the softening point of the elastomers is slightly raised. Especially advantageous is the good susceptibility of the crosslinked filaments and fibers to acid dyestuffs, which results from the improvement in the fastness properties of the dyeings due to the genuine salt formation between quaternated nitrogen and dyestuffs anions.

In addition, the possibility of genuine salt formation, for example, between sulphonic acid radical and a quaternary nitrogen atom of the macro-molecular polyurethane prepared according to the invention, makes it possible to use, for the production of crosslinked filaments and fibers, elastomer solutions which contain tertiary nitrogen atoms and alkali metal or ammonium salts of sulphonic acid in the same macro- molecule. However, the sulphonic acid radicals should always be present in less than the equivalent quantity of quaternated nitrogen atoms in such solutions. Dyeing of filaments and fibers spun from such solutions can no longer be carried out with basic dyestuffs but only with acid dyestuffs.

The invention is further illustrated but not limited by the following examples in which parts are by weight unless otherwise specified.

EXAMPLE 1

About 500 parts of a polyester of adipic acid, 1,6-hexanediol and 2,2-dimethyl-1,3-propanediol (proportion by weight of glycols 65/35; OH number 55:5, acid number 0.8) are dehydrated for about one hour at about 120° C./12 mm. Hg and reacted by stirring at from about 80 to about 85° C. for about 45 minutes with about 187.6 parts of diphenylmethane-4,4′-diisocyanate.

The melt of polyester-diisocyanate-adduct and free diisocyanate is intensively mixed with 1916 parts of dimethylformamide in which about 30 parts of N,N′-bis-beta-hydroxyethyl-piperazine and about 5.5 parts of water are dissolved. At a reaction temperature of about 50° C., the solution acquires the necessary viscosity for spinning after some hours. Further reaction is stopped by the addition of about 5 parts of water and cooling of the water to room temperature. The solution has a solid content of 27% and contains 486 milliequivalents tertiary N/kg. elastomer substance.

A part A of the solution is thoroughly stirred with 4,4′-bis-(chloromethyl)-diphenylether in a quantity of 480 milliequivalents Cl./kg. of elastomer substance, filtered and evacuated. This solution is stable for several days at room temperature.

By spinning the solution into a water bath at about 60° C., and tempering the resulting filaments at about 100° C. for about 60 minutes, crosslinked elastic filaments which are insoluble in DMF and have good textile technological properties are obtained:

Titre—480 den.
Tensile strength—0.5 g./den.
Elongation at break—480%
Permanent elongation [1]—13%
300% modulus:
    (1) cycle—120 mg./den.
    (2) cycle—90 mg./den.
    (3) cycle—80 mg./den.

[1] After stretching three times to 300% at a stretching and release speed of 400%/minute measured after a recovery time of 30 seconds.

A part B of the solution is thoroughly stirred with 1,3-dimethyl-4,6-di-(chloromethyl)-benzene in a quantity of 480 milliequivalents Cl./kg. of elastomer substance, filtered and evacuated. The solution, which is stable for several days at room temperature, is spun into a 60° C. hot precipitation bath through a multi-aperture spinnerette and the coagulated filaments are drawn off at a speed of 20 m./minute. After tempering at about 100° C. for about 60 minutes, the filaments are cross-linked and insoluble in DMF. They have the following properties:

Titre—500 den.
Tensile strength—0.6 g./den.
Elongation at break—450%
Permanent elongation—14%
300% modulus:
    (1) cycle—140 mg./den.
    (2) cycle—110 mg./den.
    (3) cycle—100 mg./den.

EXAMPLE 2

About 250 parts of the polyester mentioned in Example 1 are reacted with about 93.8 parts of diphenylmethane-4,4′-diisocyanate by the method described in Example 1. By further reacting the mixture with about 7.5 parts of N,N′ - bis-(gamma-aminopropyl)-N,N′-dimethylethylene diamine and about 3.6 parts of water in about 934 parts of dimethylformamide, a highly viscous spinning solution is obtained after stopping the reaction with about 2.5 parts of water. The solution has a solids content of 27% and contains 215 milliequivalents tertiary N/kg. elastomer substance.

1,3 - dimethyl - 4,6-di-(chloromethyl)-benzene is then stirred into the solution in a quantity of 215 milliequivalents Cl./kg. elastomer substance. After filtration and removal of gas, the solution is spun into endless filaments in accordance with Example 1. After tempering at about 100° C. for about 60 minutes and several days storage at room temperature, these filaments have the following properties:

Titre—520 den.
Tensile strength—0.5 g./den.
Elongation at break—450%
Permanent elongation—14%
300% modulus:
    (1) cycle—130 mg./den.
    (2) cycle—100 mg./den.
    (3) cycle—90 mg./den.

EXAMPLE 3

About 250 parts of the dehydrated polyester described in Example 1 are treated with about 10 parts of bis-(beta-hydroxypropyl)-methylamine, and reactive with about 78.1 parts of diphenylmethane-4,4′-diisocyanate for about 45 minutes at about 80 to about 85° C., the mixture being stirred during the reaction.

The NCO-containing preadduct is dissolved, with intensive mixing, in about 906 parts of dimethylformamide, containing about 2 parts of water. After several hours at 40 to 45° C., the solution has the necessary spinning viscosity. Further reaction is stopped by the addition of about 2.5 parts of water and cooling to room temperature. The solution has a solids content of 27% and contains 203 milliequivalents tertiary N/kg. of elastomer substance.

The solution is stirred with 4,4′-bis-chloromethyldiphenylether in a quantity of 200 milliequivalents Cl/kg. elastomer substance, filtered, evacuated and spun into filaments in accordance with Example 1. After tempering, the filaments are insoluble in DMF and swell only slightly.

EXAMPLE 4

About 250 parts of the dehydrated polyesters described in Example 1 are reacted, with stirring, at 85/90° C. with about 62.5 parts of diphenylmethane-4,4′-diisocyanate for about 60 minutes.

The NCO-containing preadduct is rapidly dissolved in about 487 parts of dimethylformamide ($H_2O$-content 0.018%) with intensive stirring and cooled to room temperature. This solution is added dropwise at 15 to 25° C. in the course of about 30 minutes into a suspension prepared from about 10 parts of N,N′-bis-(gamma-aminopropyl)-N,N′-dimethylethylene diamine, about 6.28 parts of ethylene diamine and about 15 parts of solid carbon dioxide in about 500 parts of dimethylformamide. The suitable viscosity for spinning is reached after some hours. The solution has a solid content of 25% and contains 300 milliequivalents tertiary N/kg. of elastomer substance.

The solution is stirred together with 4,4'-bis-chloromethyldiphenylether in a quantity of 300 milliequivalents Cl/kg. elastomer substance, filtered, evacuated and spun into filaments in accordance with Example 1. After tempering, the filaments are insoluble in DMF and swell only slightly.

EXAMPLE 5

About 250 parts of the dehydrated polyester described in Example 1 are reacted with about 56.25 parts of diphenylmethane-4,4'-diisocyanate for about 45 minutes at 90 to 95° C.

The NCO-containing adduct is rapidly dissolved, with intensive stirring, in about 500 parts of dimethylformamide ($H_2O$-content 0.014%). The temperature of the solution is about 40° C. This solution is added dropwise at about 70° C. into a solution of about 10 parts of N,N'-bis-(gamma-aminopropyl) - N,N' - dimethyl-ethylene diamine and about 4.56 parts of carbodihydrazide in about 368 parts of dimethylformamide and then stirred for another 30 minutes at about 70° C. The reaction solution is left to cool, but about 0.5 part of hexamethylene-1,6-diisocyanate are stirred into it at about 50° C. The solution has a solids content of 27% and contains 308 milliequivalents tertiary N/kg. elastomer substance.

The solution is stirred together with 4,4'-bis-chloromethyldiphenylether in a quantity of 300 milliequivalents Cl/kg. elastomer substance, filtered, evacuated and spun into filaments according to Example 1. After tempering, the filaments are insoluble in DMF and swell only slightly.

EXAMPLE 6

About 15,000 parts of a polyester of adipic acid, 1,6-hexanediol and 2,2-dimethyl-1,3-propanediol (proportion by weight of glycols 65/35; OH number 55; acid number 1.2) are dehydrated for about 2 hours at about 90° C./15 mm. Hg in an autoclave equipped with stirrer, and then reacted with about 5630 parts of diphenylmethane-4,4'-diisocyanate at about 70 to about 75° C. with stirring. After a reaction time of about 45 minutes, about 450 parts of bis-beta-hydroxyethylpiperazine dissolved in about 2000 parts of DMF, about 8 parts of 4,4'-diamino-diphenyl-2,2'-disulphonic acid lithium, dissolved in about 500 parts of DMF, about 220 parts of water; dissolved in about 2000 parts of DMF and about 45,000 parts of DMF as solvent, are all added simultaneously to the melt and the reaction mixture is left at a temperature of about 50° C. The solution is already markedly viscous after 120 to 150 minutes, when about 520 parts of rutile matting pigment suspended in about 3000 parts of DMF are stirred into it. After a further 60 to 120 minutes, the solution is highly viscous and the reaction is stopped by adding 200 parts of water dissolved in about 5,000 parts of DMF, and at the same time, cooling.

After degasification and filtration, the solution, which has a solids content of 27%, has a viscosity of 800 poises/20° C. The tertiary nitrogen atom content available for the crosslinking with the polyfunctional alkylating agents through a quaternating reaction amounts to 250 milliequivalents/kg. of elastomer substance.

To produce the crosslinked elastomer filaments, the following components are in each case thoroughly stirred:

(A) About 1,000 parts of the solution with about 9.2 parts by weight of 4,4'-bis-chloromethyl-diphenylether dissolved in about 10 parts of DMF, (B) About 1,000 parts of the solution with about 7 parts by weight of 1,3-dimethyl-4,6-dichloromethylbenzene, dissolved in about 10 parts of DMF, and (C) About 1,000 parts of the solution with about 6.1 parts of p-xylylenedichloride, dissolved in about 10 parts of DMF.

These solutions, provided with different crosslinking agents as well as a portion of solution into which no crosslinking agent has subsequently been stirred, are spun successively under comparable conditions by spinning into a shaft heated to about 200° C., to which pre-heated air at about 220° C. is blown on the multi-aperture nozzle, to form endless multifilaments at a draw off speed of 300 m./minutes. After a storage time of 10 days, or a heat treatment at about 100° C. for about one hour, the filaments have the properties given in Tables 1 and 2.

To assess the crosslinking, the change in length $\Delta l$, in percent under a load of 0.05 g./den. for 10 minutes, based on the percentage elongation after an initial loading time of one minute, was determined as a measure of the flow of the filaments.

TABLE 1.—THE PHYSICAL PROPERTIES OF CROSSLINKED ELASTOMER FILAMENTS

| Part | Crosslinking agent | Titer den. | F. g./den. | Elongation at break | Elongation permanent, percent | 300%-modulus mg./den. | | | Δl percent/10 min. | Solubility in DMF |
|---|---|---|---|---|---|---|---|---|---|---|
| | | | | | | 1 cycle | 2 cycle | 3 cycle | | |
| A | 4,4'-bis-chloromethyl diphenyl ether. | 420 | 0.9 | 480 | 12 | 200 | 170 | 160 | 20 | Insoluble. |
| B | 1,3-dimethyl-4,6-dichloromethyl benzene. | 420 | 0.9 | 480 | 12 | 210 | 180 | 165 | 20 | Do. |
| C | p-xylylenedichloride. | 420 | 0.9 | 480 | 12 | 200 | 170 | 155 | 20 | Do. |
| D | None | 420 | 0.8 | 530 | 15 | 140 | 100 | 90 | 50 | Soluble. |

TABLE 2.—COLOR PROPERTIES OF CROSSLINKED ELASTOMER FILAMENT

| Part | Crosslinking agent | Assessment of dying color tone with 1% telonechtrot ER [1] | Fastness to washing according to DIN 54,010 [2] | Fastness to perspiration DIN 54,020 | |
|---|---|---|---|---|---|
| | | | | Acid | Alkaline |
| A | 4,4'-bis-chloromethyl-diphenyl ether. | Brilliant.. Deep red.. | 3-4 | 3-4 | 3 |
| B | 1,3-dimethyl-4,6-dichloromethyl benzene. | ...do...........do....... | 3-4 | 3-4 | 3 |
| C | p-xylylenedichloride | ...do...........do....... | 3-4 | 3-4 | 3 |
| D | None | ...do...........do....... | 3-4 | 3 | 2-3 |

[1] C.I. Supplement P. 1084, Acid Dye.
[2] Bleeding of a fabric of polycaprolactam-filament was assessed Best Mark 5.
Lowest Mark 1.

The permanent elongation was determined after stretching the filaments three times to 300%, at stretching and release speed of 400%, after a recovery time of 30 seconds.

To determine the susceptibility to dyestuffs or the color fastness, the filaments were dyed at a pH of 4–5 with 1% Telonechtrot EB (C. I. Supplement, page 1084, acid dye), and the wash fastness at 60° C. was determined according to DIN 54,010, and the fastness to acid and alkaline perspiration according to DIN 54,020 on the dyed sample.

Although the invention has been described in considerable detail in the foregoing for the purpose of illustration, it is to be understood that such detail is solely for this purpose and that variations can be made by those skilled in the art without departing from the spirit and scope of the invention except as is set forth in the claim.

What is claimed is:

1. In a method of making polyurethane filaments and fibers which comprises preparing in a first step a polyurethane polymer containing at least 100 milliequivalents of tertiary nitrogen per kilogram of polyurethane polymer by reacting a substantially linear polymeric polyhydroxyl compound having an hydroxyl number of from about 35 to about 120 with an excess of up to 300% of an organic diisocyanate at a temperature less than about 150° C. and reacting the NCO terminated product thus formed in a polar solvent at a temperature of from about −10° C. to about 100° C., with from about 80 to 130%, based on the NCO groups present, of a mixture of chain-extending agents containing up to 50 mol percent of a glycol containing at least one tertiary nitrogen atom or up to 50 mol percent of a diamine containing at least one tertiary nitrogen atom, the improvement which comprises adding to a solution of the polyurethane polymer an amount up to an equivalent quantity of a bis-alkylating agent selected from the group consisting of 4,4′-bis-chloromethyl-diphenyl ether and 1,3-dimethyl-4,6-di(chloromethyl) benzene, spinning the solution into a filament and exposing the spun filament to a temperature of from about 50° C. to about 150° C.

References Cited

UNITED STATES PATENTS

| | | | |
|---|---|---|---|
| 3,294,752 | 12/1966 | Wilkinson | 260—77.5 |
| 3,357,954 | 12/1967 | Kirkaldy | 260—75 |
| 3,395,129 | 7/1968 | Dieterich et al. | |

FOREIGN PATENTS

| | | | |
|---|---|---|---|
| 745,687 | 2/1956 | Great Britain | 260—77.5 SP UX |
| 1,184,946 | 1/1965 | Germany | 260—77.5 Q UX |

OTHER REFERENCES

Deutsche Auslegeschrift 1,156,977, Dieterich et al. (1963), pages 1–6.

Deutsche Auslegeschrift 1,184,946, Dieterich (1965), pages 1–6.

DONALD E. CZAJA, Primary Examiner

H. S. COCKERAM, Assistant Examiner

U.S. Cl. X.R.

260—77.5 AA, 77.5 Q; 264—184